United States Patent [19]

Nagashima

[11] Patent Number: 4,596,465

[45] Date of Patent: Jun. 24, 1986

[54] SCATTERED LIGHT TYPE SMOKE DETECTOR

[75] Inventor: Tetsuya Nagashima, Tokyo, Japan

[73] Assignee: Hochiki Kabushiki Kaisha, Japan

[21] Appl. No.: 595,230

[22] Filed: Mar. 30, 1984

[30] Foreign Application Priority Data

Mar. 31, 1983 [JP] Japan ............................ 58-47877[U]

[51] Int. Cl.[4] ...................... G01N 15/06; G08B 17/00

[52] U.S. Cl. .................................... 356/338; 356/337; 250/574; 340/630

[58] Field of Search ....................... 356/337, 338, 339; 250/237 R, 574; 350/276 R, 276 SL; 340/630

[56] References Cited

U.S. PATENT DOCUMENTS 4,216,377 8/1980 Hasegawa et al. .................. 250/574
4,397,557 8/1983 Herwig et al. ...................... 250/574

FOREIGN PATENT DOCUMENTS 0031096 7/1981 European Pat. Off. ............ 340/630
0036785 3/1980 Japan .................................. 250/574

*Primary Examiner*—R. A. Rosenberger
*Assistant Examiner*—Crystal Cooper
*Attorney, Agent, or Firm*—Armstrong, Nikaido, Marmelstein & Kubovcik

[57] ABSTRACT

A scattered light type smoke detector wherein a light source and a photo-cell are so disposed that light from the light source does not directly enter the photo-cell and the photo-cell is adapted to receive light from the light source scattered by intervening smoke to detect the presence of smoke. The photo-cell is accommodated in a cylindrical recess formed in a smoke detecting holder. The inner face of the cylindrical recess and the surface of the smoke detecting holder extending along the optical axis of the photo-cell has light traps formed in sawteeth configuration in section for reflecting light other than the scattered light to be detected into a direction not towards the photo-cell.

9 Claims, 11 Drawing Figures

SCATTERED LIGHT TYPE SMOKE DETECTOR

BACKGROUND OF THE INVENTION

1. Field of the Invention

This invention relates to a scattered light type smoke detector which is capable of enhancing reduction of noises due to the internal reflection thereof.

2. Description of Prior Art

There has been proposed a scattered light type smoke detector adapted with a view to lowering a noise level in which a light source and a photo-cell are so disposed that the optical axes thereof intersect each other at a specific angle so as to prevent the light from the light source from directly entering the photo-cell and a shading member is provided in the vicinity of a smoke detecting area where the optical axes intersect each other to prevent the light from the light source from passing around to the photo-cell and to prevent possible misoperation due to condensation caused on the inside of the detector and insects etc. attached thereto.

A more specific structure for reducing a noise level has been further proposed wherein a conical portion is formed on the bottom of a smoke detecting holder at a position under the smoke detecting area so as to reflect the incident light from the light source deflected from the smoke detecting area or reflected light into the direction other than the direction to the photo-cell so as not to enter the light into the photo-cell for reduction of the noise level due to the inner reflection.

In this connection, it is to be noted that, in the scattered light type smoke detector, weak scattered light irregularly reflected by fine particles of smoke is detected by a photo-cell and therefore noise light due to the internal reflection of the light from the light source should be minimized. To this end, various means are proposed in the above-mentioned prior arts for lowering the noise light, but there have been no smoke detectors which successfully improve the inner surface of the smoke holder to reduce the noise light. By this reason, there remains such a problem that the reflected light within the smoke holder is reflected from said inner surface of the holder to enter the photo-cell to raise a noise level.

There is another problem that since the tip end of the shading board is positioned in the vicinity of the smoke detecting area, water drop attached to the tip end of the shading board causes the light to be bent or reflected to enter the photo-cell, causing misoperation.

Although the light towards the surface of the conical portion can be reflected into the direction so as not to enter the photo-cell, there is a further problem that the light incident on the apex of the conical portion is reflected by the apex into directions of 180° and the reflected light possibly enters the photo-cell. Thus, there is a limit in the prior arts in reduction of noise level due to the internal reflection.

The conventional scattered light type smoke detectors which are proposed to reduce the noise level include smoke detectors taught by U.S. Pat. No. 4,099,065 issued July 4, 1978 to William J. Malinowski, U.S. Pat. No. 4,112,310 issued Sept. 5, 1978 to William J. Malinowski, U.S. Pat. No. 4,216,377 issued Aug. 5, 1980 to Mitsuo Hasegawa, Yoshinori Shinohara, Takashi Suzuki and Akira Yokota. However, none of these detectors can solve the problems as mentioned above satisfactorily.

In addition, it is required for the scattered light type smoke detector to obtain a certain output voltage of the photo-cell for providing a required sensitivity to the incoming smoke having a cetain extinction modulus. For example according to UL Standards which is known as the most strict standards, it is required to obtain a predetermined fire detection sensitivity at an extinction modulus of 4%/ft or less when gray smoke produced upon burning of cotton wick enters and at an extinction modulus of 10%/ft or less upon entering of black smoke produced by burning of kerosine etc.

OBJECT OF THE INVENTION

It is an object of the present invention to provide a scattered light type smoke detector which is capable of obviating the problems involved in the prior arts and capable of almost completely preventing entering of the light reflected from the inside of the smoke holder into the photo-cell and suppressing a noise level.

It is another object of the present invention to provide a scattered light type smoke detector which is capable of satisfying strict requirements for the smoke detection characteristic such as UL Standards.

Other objects and effects of the present invention will be apparent from the following description.

SUMMARY OF THE INVENTION

The scattered light type smoke detctor of the present invention has, in its preferred embodiment, a plurality of light traps provided on a smoke detecting holder wherein light source and a photo-cell are disposed at an angle in which the light from the light source does not directly enter the photo-cell and having a shape of saw-teeth in section for reflecting the light in the direction so as not to enter the photo-cell. A similar light trap is provided within a cylindrical recess of the smoke detecting holder containing the photo-cell therein. With this arrangement, the smoke detector of the present invention is so adapted that only scattered light directly caused by the smoke entering the smoke detecting area around the intersection of the optical axes of the light source and the photo-cell enter the photo-cell and other light is kept from entering the photo-cell to prevent possible misoperation by noise light.

BRIEF DESCRIPTION OF THE DRAWINGS

FIG. 3(*b*) is an enlarged sectional view of a second light trap employed in the smoke detector of FIG. 1;

DESCRIPTION OF THE PREFERRED EMBODIMENT

Figure 1:
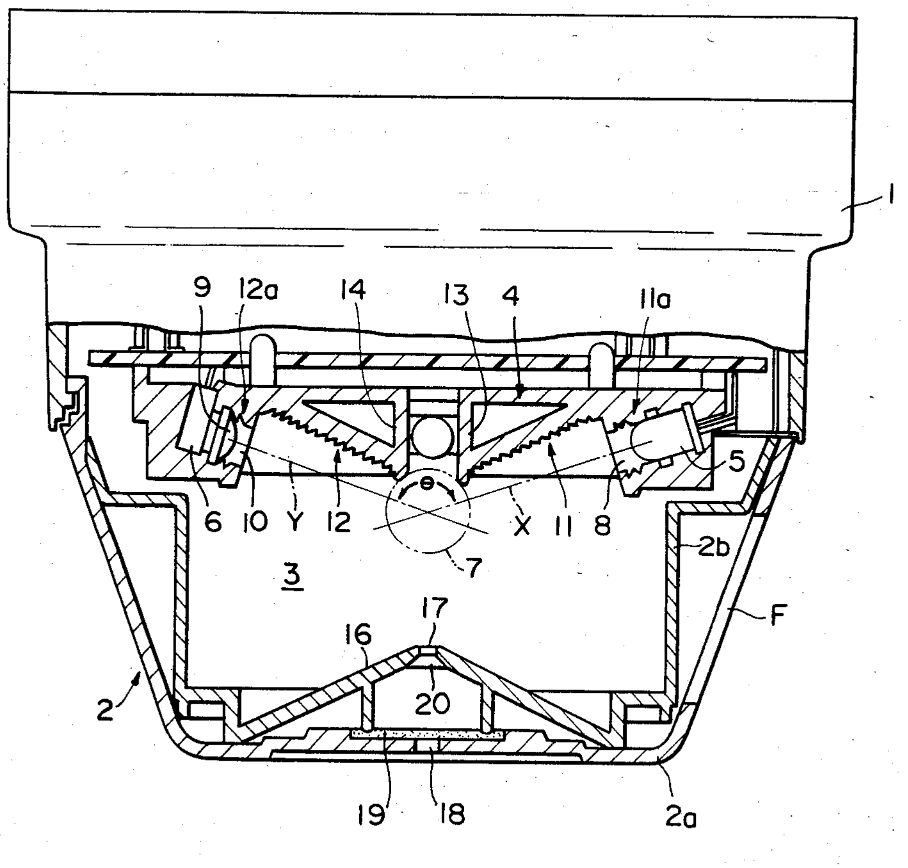
FIG. 1 is a side view of a scattered light type smoke detector according to the present invention, shown partly in section.

Referring now to the drawings, there is illustrated one form of scattered type smoke detector according to the present invention which is capable of reducing noises produced by the internal reflection within the detector.

In the drawings, numeral 1 designates a body of the smoke detector a housing 2 is removably fitted to the lower portion of the body of the smoke detector. The housing 2 comprises an outer housing member 2*a* formed with a smoke entrance port F and an inner housing member 2*b* having a function of a labyrinth plate, that is , smoke may be admitted freely through such a wall, but light rays are attenuated, such as, by reflection and absorption and do not pass through this wall. A dark chamber 3 is formed within the housing in cooperation with the body of the smoke detector. A fire detector holder 4 is provided at an upper portion within the housing 2. The holder 4 includes a light source 5 and a photo-cell 6 incorporated therein. The light source 5 and the photo-cell 6 are so disposed that the respective optical axes X and Y are inclined downwardly so that the light from the light source 5 may not directly enter the photo-cell 6, and a smoke detecting area 7 is formed at a space within the dark chamber 3 where the optical axes X and Y intersect each other. The intersecting angle $\theta$ of the optical axes X and Y is set to be 145°. The mounting angles of the light source 5 and the photo-cell 6 onto the holder 4 are adjusted so as to obtain the accurate intersecting angle of 145°. However, practically, the intersecting angle $\theta$ may have an allowable error of ±2.5° due to the error in measurement in assemblying.

The light source 5 may, for example, be a light emitting diode which emits infrared light and the light emitting diode is mounted at the bottom of a cylindrical recessed portion 8 formed in the holder 4. The photo-cell 6 may be an infrared photo-diode which receives, through a lens, scattered light produced by smke entering the smoke detecting area 7 whire the optical axes X and Y intersect each other and it is mounted at the bottom of a cylindrical recess 10 formed similarly in the holder 4.

First light traps 11 and 12 formed in sawteeth configuration in section are provided on the inner surface of the holder 4 along the optical axes X and Y of the light source 5 and the photo-cell 6, respectively. The light trap 11 provided on the side of the light source 5 has teeth whose serrated edges are directed to the light source 5, while the light trap 12 provided on the side of the photo-cell 6 has teeth whose serrated edges are directed to the photo-cell 6. The teeth of the light traps 11 and 12 are so formed that the faces T thereof which are located on the side of the light source 5 and the photo-cell 6, respectively, have an angle $\alpha$ relative to the optical axes X and Y. The angle $\alpha$ is set to be 90° or more and set for example within the range of 90° to 110°. The included angle $\beta$ of the respective teeth is set to be 60° or less and the pitch P of the respective teeth is about 1 mm. Although the smaller the pitch P of the teeth, the more effect of elimination of light noises can be obtained, the pitch P is set around 1 mm because of a limitation in manufacturing.

Figure 2:
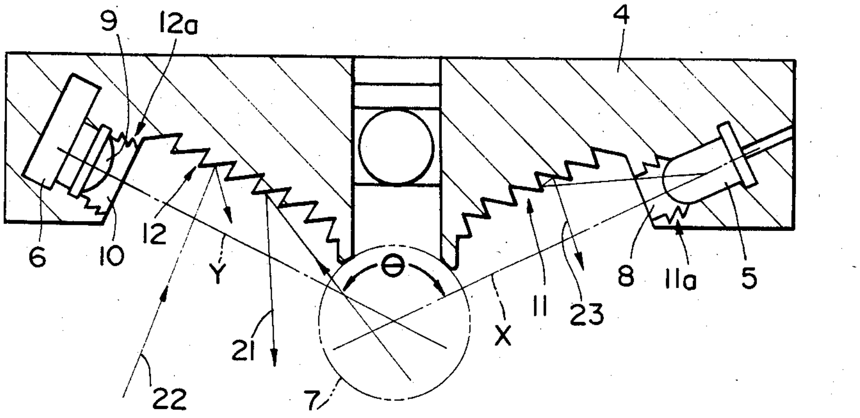
FIG. 2 is an enlarged sectional view of a smoke holder employed in the smoke detector of FIG. 1.

The cylindrical recesses 8 and 10 have second light traps 11*a* and 12*a*, respectively, which are formed with sawteeth similar to those of the light traps 11 and 12. The sawteeth of the light trap 11*a* on the side of the light source 5 is directed to the light source 5 and the sawteeth of the light trap 12*a* on the side of the photo-cell 6 are directed oppositely as shown in FIG. 2.

These light traps 11, 12, 11*a* and 12*a* function to reflect noise light in a direction not towards the photo-cell 6, or to repeatedly reflect the light from the serrated edges to the root of the respective sawteeth to the light traps 11, 12, 11*a* and 12*a* so as to attenuate the energy of the noise light to a negligible level.

Shading boards 13 and 14 are disposed keeping a space therebetween on the holder 4 at a position just above the smoke detecting area 7. The space S between the shading boards 13 and 14 is for example 10 mm as will be explained later. The tip ends, i.e., lower ends of the respective shading boards 13 and 14 are positioned over the line Z which connects a point V, the lower end of the opening of the recess 8 containing the light source 5 therein and a point W, the lower end of the opening of the recess 10 containing the photo-cell 6 therein. The disposition of the shading boards 13 and 14 wherein their respective layer ends are positioned on the side of the smoke detecting area 7 beyond the line Z includes the state where the lower ends are positioned just on the line Z and the lower ends are projected into the side of the smoke detecting area 7 beyond the line Z.

Figure 6:
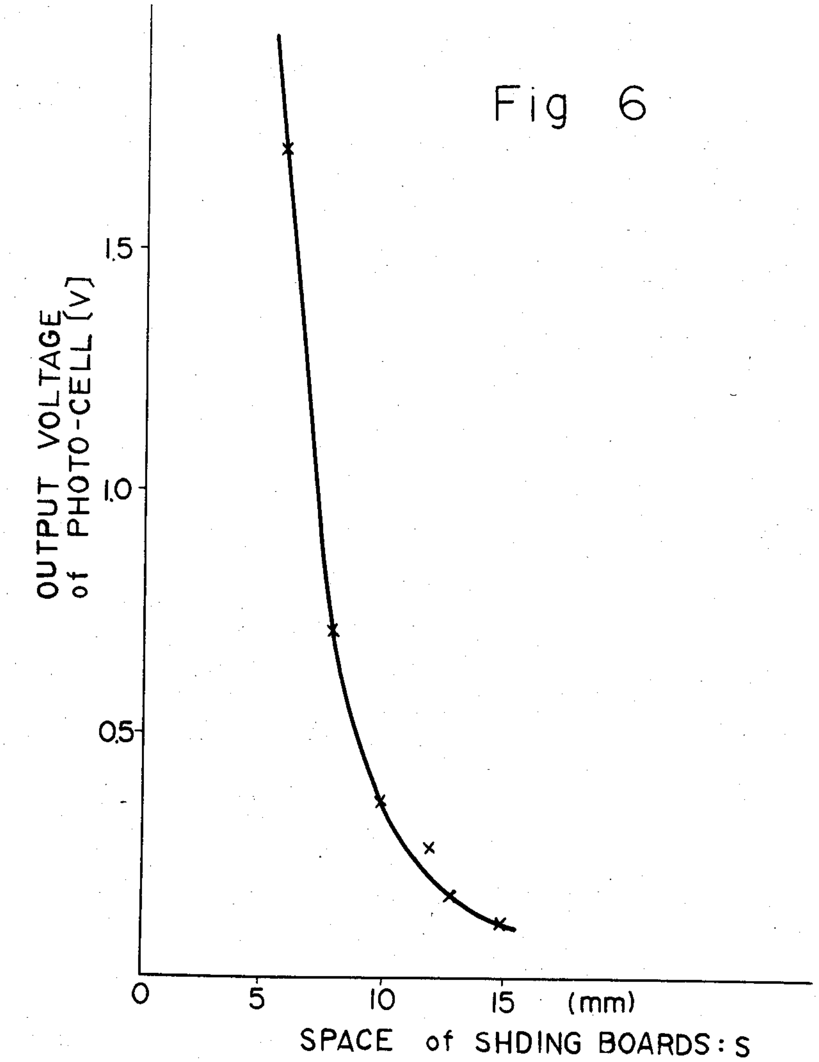
FIG. 6 is a graph showing the relationship between the space between the shading boards and the output voltage of the photo-cell.

With respect to the space S between the shading boards 13 and 14, there is a relationship between the space S and the output voltage of the photo-cell 6 as shown in FIG. 6 which is measured by varying the space S while attaching a water drop 15 on the lower end of the shading board 14 positioned on the side of the light source 5.

As the space S between the shading boards 13 and 14 is made smaller, the output voltage of the photo-cell 6 is increased due to the attachment of the water drop 15, while as the space S is made larger, the output voltage of the photo-cell 6 is lowered due to the attachment of the water drop 15. In the present embodiment, the space S between the shading boards 13 and 14 is selected to be 10 mm so as to avoid possible false alarm due to the attachment of the water drop 15.

A conical portion 16 is formed on the bottom of the inner housing member 2*b* under the smoke detecting area 7 and it has, at the apex thereof, a small hole 17 which opens vertically upwardly. A pin inserting hole 18 is formed in the outer housing member 2*a* at a position opposite to the small hole 17. A cellular material member 19 is disposed inside of the outer housing member 2*a* and held between the outer housing member 2*a* and the inner housing member 2*b*. A conical hole 20 is formed below the small hole 17 so as to communicate therewith to shorten the axial length 1 of the small hole 17. If the length 1 of the small hole 17 is large, the light incident on the wall of the small hole 17 is reflected towards the photo-cell 6 which is positioned above the small hole 17. The small hole 17 also functions as a pin inserting hole for the operating test of the smoke detector. In the test, a test pin is inserted through the pin inserting hole 18 of the outer housing member 2*a*, the cellular material member, and the small hole 17 and the tip end of the test pin is projected into the smoke detecting area 7 so as to reflect light to enter the photo-cell 6 for the operation test.

The reason why the optical axes X and Y of the light source 5 and the photo-cell 6 are intersected at an angle of 145° will now be described.

Figure 10A:
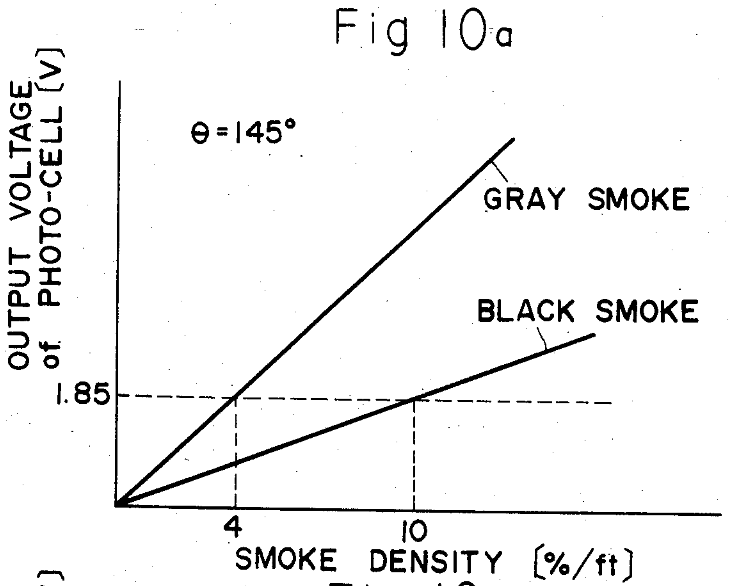
FIGS. 10(*a*) and (*b*) are graphs showing the relationships between the smoke density and the output voltage of the photo-cell in case the intersecting angle of the optical axes is set at 145° and in case the intersecting angle of the optical axes is set at 90°, respectively.
Figure 10B:
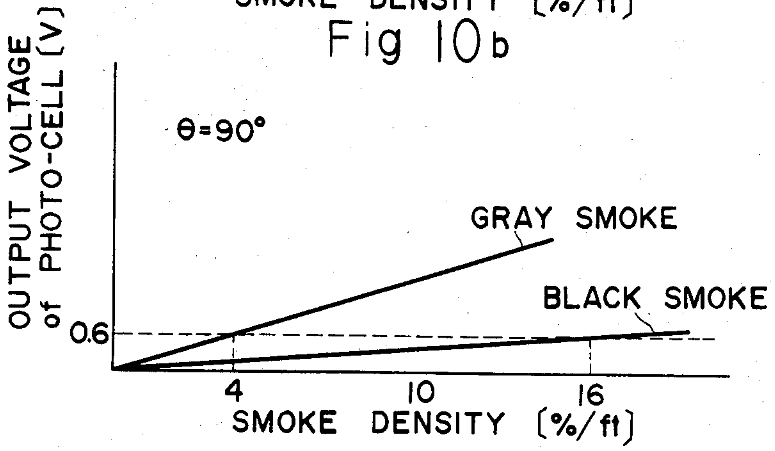

FIG. 10(*a*) shows the output voltage of the photocell 6 in relation with the densities of gray smoke and black smoke when the intersecting angle $\theta$ is set at 145°. An output voltage of 1.85 V which assures the required detection sensitivity is obtained by a density of gray smoke produced when a cotton wick is burned and having an extinction modulus of 4%/ft and by the density of black smoke produced when kerosine is burned and having an extinction modulus of 10%/ft.

On the other hand, when the intersecting angle $\theta$ is set at 90°, the output voltage of the photo-cell 6 is reduced to 0.6 V by the density of gray smoke having an extinction modulus of 4%/ft as shown in FIG. 10(*b*). Thus, the output voltage of the photo-cell 6 is remarkably reduced as compared to the present invention in which the intersecting angle is set at 145° as shown in FIG. 10(*a*). The same output as of the gray smoke can not be obtained at the smoke density having an extinction mo ulus of 10%/ft and the output voltage of 0.6 V can be obtained only when the density is increased to have an extinction modulus of 16%/ft.

Thus, the output voltage of the photo-cell 6 is reduced and the relative difference of the output voltage becomes larger as the intersecting angle $\theta$ becomes smaller. It can be understood that an output voltage of 1.85 V which assures required detection sensitivity can be obtained only by the intersecting angle of 145° at the density of gray smoke having an exinction modulus of 4%/ft or less and at the density of black smoke having an extinction modulus of 10%/ft or less. on the other hand, when the intersecting angle $\theta$ is larger than 145°, the light source 5 and the photo-cell 6 approache to a state where they are positioned face to face and noise light directed to the photo-cell 6 is unnecessarily increased. Although the noise light can be eliminated by the light traps 11, 12, 11*a* and 12*a*, it is not desirable to increase such unnecessary noise light incident on the photo-cell 6 and possibly cause misoperation.

The operation of the embodiment as illustrated in the drawings will now be described.

The light trap 12 on the side of the photo-cell 6 prevents the light reflected from the inner face of the housing 2 in the direction of arrow 21 from entering the photo-cell 6 by reflecting it by the outer teeth faces of the light trap 12 as shown in FIG. 2. Similarly, the reflected light incident in the direction of arrow 22 perpendicular to the optical axis of the photo-cell 6 is reflected by the outer teeth faces of the light trap 12 in the direction opposite to the photo-cell 6. Thus, all the light reflected from the housing 2 towards the light trap 12 is reflected into the direction so as not to enter the photo-cell 6.

The light trap 11 on the side of the light source 5 reflects the light emitted from the light source 5 as shown by arrow 23 and other light reflected from the housing 2 is reflected into the direction other than the direction towards the photo-cell 6 in a way similar to the light trap 11 on the side of the photo-cell 6. The light as indicated by arrow 23 is attenuated through the repetitive reflection within the trap 11.

Figure 3A:
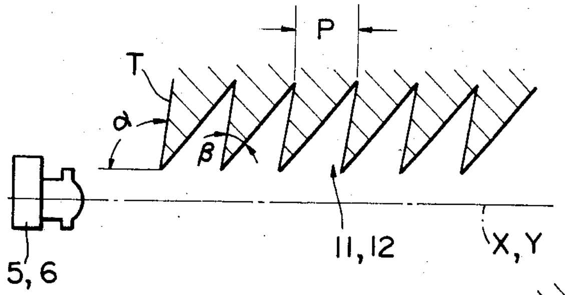
FIG. 3(*a*) is an enlarged sectional view of a first light trap employed in the smoke detector of FIG. 1.
Figure 3B:
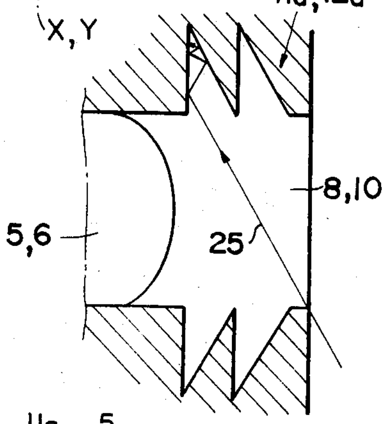
Figure 4:
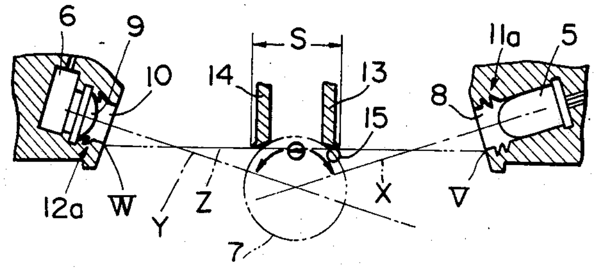
FIG. 4 is a fragmentary sectional view showing the positional relationship between shading boards, a light source and a photo-cell.

The second light traps 11*a* and 12*a* provided in the recesses 8 and 10 for the light source 5 and the photo-cell 6, respectively, operate similarly to the light traps 11 and 12. They reflect light into the direction towards other than the photo-cell 6 to prevent it from entering the photo-cell 6 or repeatedly reflect the light from the serrated edges to the root of the teeth within the light traps 11*a* and 12*a* to attenuate the energy of the light so as not to get out to the recesses 8 and 10 again as shown in FIG. 3(*b*). Thus, possible misoperation can be surely prevented.

When water drop 15 is attached to the lower end of the shading boards 13 on the side of the light source 5, light incident thereto is reflected from or bent by the water drop 15 but cut off by the shading board 14 located on the side of the light source 5 and hardly enters the photo-cell 6. On the other hand, when water drop is attached to the tip end of the shading board 14 located on the side of the photo-cell 6, light from the light source 5 is cut off by the shading board 13 of the light source 5 and the light is bent or reflected thereby and does hardly enter the photo-cell 6. In brief, even if water drop is attached to the shading boards 13 and 14, the output voltage of the photo-cell 6 is hardly increased so that possible misoperation due to the attachment of the water drop can be prevented.

Figure 5:
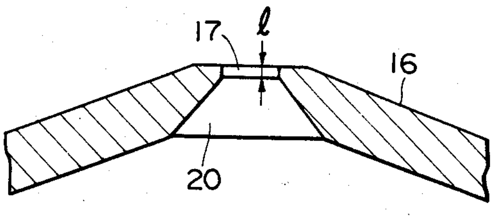
FIG. 5 is an enlarged sectional view of a conical portion of the smoke detector of FIG. 1.

The light from the light source 5 and the light reflected from the housing 2*b* towards the conical portion 16 are reflected from the conical face of the conical portion 16 into the direction not towards the photo-cell 6. Thus, noise level of the photo-cell6 is lowered. On the other hand, the light incident on the apex of the conical portion 16 enters inside of the conical portion 16 through the small hole 17 of the apex, thus preventing the light from entering the photo-cell 6 as a noise. As shown in FIG. 5, there is only little light which is reflected from the axial wall of the small hole 17 and becomes a noise to the photo-cell 6 owing to the provision of the conical hole 20.

An example of noise level measurement using the embodiment as illustrated will now be described.

Figure 7:
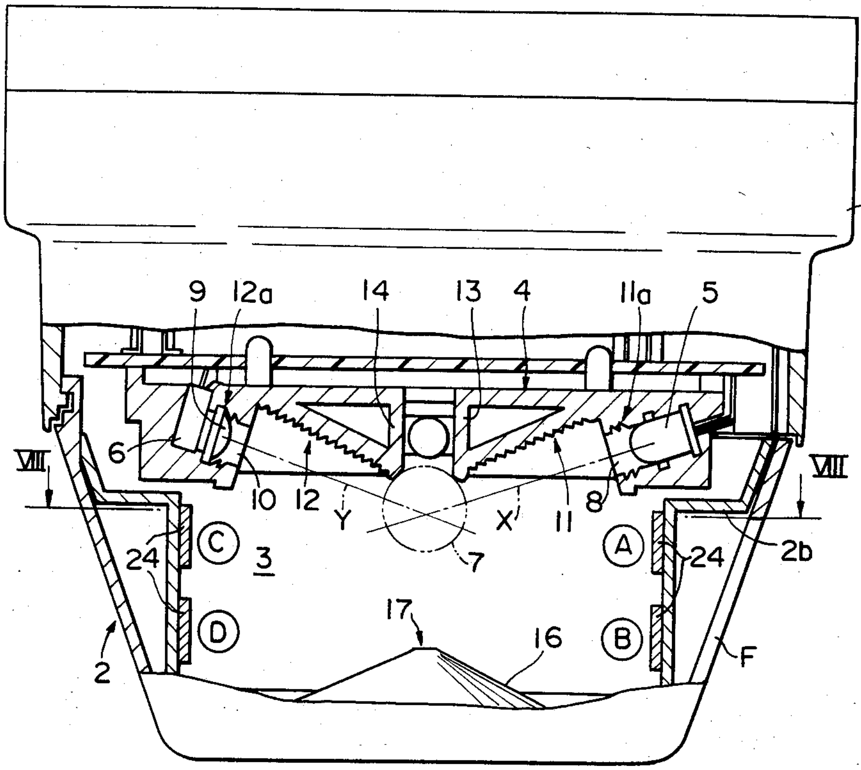
FIG. 7 is a partly sectioned view of the smoke detector showing the positions of reflecting materials attached for the experiments conducted for noise level measurement.
Figure 8:
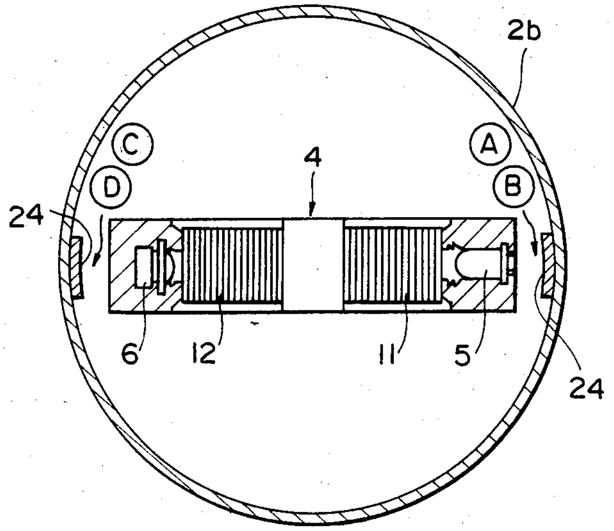
FIG. 8 is a sectional view taken on line VIII—VIII of FIG. 7.

As shown in FIGS. 7 and 8, paper tapes 24 as reflecting material are attached at positions A, B, C and D and noise level is measured. The obtained output voltage of the photo-cell is shown in the following table.

| | Without Paper Tape | Noise Increased by Paper Tape | | | |
|---|---|---|---|---|---|
| | | A | B | C | D |
| Example 1 | 0.63 | +0.3 | +0.4 | +0.25 | +0.35 |
| Example 2 | 0.77 | +0.3 | +0.3 | +2.20 | +0.40 |
| Present Invention | 0.56 | +0.3 | +0.3 | +0.20 | +0.30 |

In Example 1, a smoke detector having no light traps like light traps 11, 12, 11*a* and 12*a*. In Example 2, a smoke detector in which a light trap similar to the light trap 12 is provided on the side of the photo-cell 6 but the direction of the serrated edges thereof is opposite to that of the light trap 12. The smoke detectors of the Examples 1 and 2 are substantially the same as the smoke detector of the present invention.

The result shows that the reduction of noise level is highly enhanced in the present invention as compared with Examples 1 and 2 under the condition where no paper tape is attached, which indicates normal condition, and under the condition where the paper tapes are attached, which shows a state wherein dust or water drop is attached to the housing 2.

Figure 9:
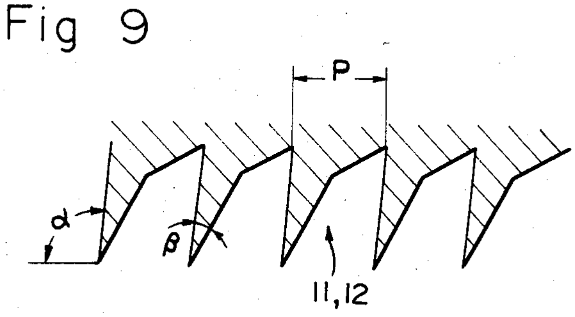
FIG. 9 is an enlarged sectional view of another form of light trap employable in the present invention.

FIG. 9 illustrates another form of the light trap employable in the present invention. In this embodiment, the teeth are formed in a two-stepped shape formed of a tip portion having smaller included angle $\beta$ and a gentle slope portion at the bottom of the teeth to impart sufficient strength of the teeth. With this reduced included angle $\beta$, light entering the light trap is repeatedly reflected between the opposite teeth faces and attenuated through the repetitious reflection to prevent the light from being leaked out of the light trap. Thus, the absorption and attenuation effect of the reflected light by the light trap is more enhanced.

It should also be understood that the foregoing disclosure relates only to preferred embodiments of the invention, and that it is intended to cover all changes and modifications of the examples described which do not constitute departures from the spirit and scope of the invention as set forth in the appended claims.

I claim:

1. A scattered light type smoke detector adapted to prevent incident light from entering a detector which comprises:

(a) a housing to provide a dark chamber;

(b) a holder member in said housing;

(c) a light source and a photo-cell detector mounted in said housing, said light source and said photo-cell being disposed at an angle such that light from the light source does not directly enter in the photo-cell, and a smoke detecting area is formed in the vicinity of the intersection of the optical axis of the light source and the photo-cell;

(d) a first light trap means extending along a surface of said holder member from adjacent said photo-cell to adjacent said smoke detecting area in a plane parallel to the optical axis of said photo-cell, said first light trap means including a serrated wall surface to attenuate incident light or to reflect incident light so as not to enter the photo-cell;

(e) a second light trap means disposed circumferentially around the interior walls of a cylindrical recess in which said photo-cell is mounted, said second light trap means including a serrated surface to attenuate or reflect incident light;

(f) the edges of the serrated surfaces of first and second light trap means being directed towards each other.

2. A scattered light type smoke detector as claimed in claim 1, wherein said serrated wall surface comprises a plurality of ridges each having a tip portion formed by a triangular shaped cross-section having an acute angle and an inner portion in which at least one of the triangular walls deviates at a less acute angle.

3. A scattered light type smoke detector as claimed in claim 1, wherein the light source is contained in a cylindrical recess provided on the smoke detecting holder and a light trap means is provided in the cylindrical recess which includes a serrated surface with its edges directed towards the light source to attenuate incident light or to reflect incident light into a direction not towards the smoke detecting area.

4. A scattered light type smoke detector as claimed in claim 1, and further comprising shading members including two boards disposed adjacent the smoke detecting area with a space of 10 mm or more therebetween.

5. A scattered light type smoke detector as claimed in claim 2, wherein the light source is contained in a cylindrical recess provided on the smoke detecting holder and a light trap means is provided in the cylindrical recess which has a serrated surface with edges directed toward the light source to attenuate incident light or to reflect incident light into a direction not towards the smoke detecting area.

6. A scattered light type smoke detector as claimed in claim 2, and further comprising shading members including two boards disposed adjacent the smoke detecting area with a space of 10 mm or more therebetween.

7. A scattered light type smoke detector as claimed in claim 4, wherein the light source is contained in a cylindrical recess provided on the smoke detecting holder and a light trap means is provided in the cylindrical recess which has a serrated surface with edges directed toward the light source to attenuate incident light or to reflect incident light into a direction not towards the smoke detecting area.

8. A scattered light type smoke detector as claimed in claim 5, and further comprising shading members including two boards disposed adjacent the smoke detecting area with a space of 10 mm or more therebetween.

9. A scattered light type smoke detector adapted to prevent incident light from entering a detector which comprises:

(a) a housing to provide a dark chamber;

(b) a holder member in said housing;

(c) a light source and a photo-cell detector mounted in said housing, said light source and said photo-cell being disposed at an angle such that light from the light source does not directly enter the photo-cell and a smoke detecting area is formed in the vicinity of the intersection of the optical axis of the light source and the photo-cell;

(d) a first light trap means including a ridged surface disposed on a surface of the smoke detecting holder extending along the optical axis of the photo-cell, the peaks of the ridges being directed toward the photo-cell for reflecting incident light into a direction so as not to enter the photo-cell;

(e) a second light trap means disposed circumferentially around the interior walls of a cylindrical recess in which said photocell is mounted, said second light trap means including a ridged surface the peaks of the ridges directed oppositely to those of the first light trap means to attenuate incident light or to reflect incident light in a direction so as not to enter the photo-cell;

(f) said light source and photo-cell being disposed such that their optical axes are inclined downwardly and intersect at an angle of 145°.

* * * * *